United States Patent [19]
Epple

[11] Patent Number: 5,938,282
[45] Date of Patent: Aug. 17, 1999

[54] CONTROL DEVICE FOR VEHICLES

[75] Inventor: Johann Epple, Marktoberdorf, Germany

[73] Assignee: Agco GmbH & Co., Germany

[21] Appl. No.: 08/878,312

[22] Filed: Jun. 18, 1997

[30] Foreign Application Priority Data

Jun. 19, 1996 [DE] Germany ............................ 196 24 463

[51] Int. Cl.$^6$ .............................. A47C 7/72; B60K 26/00
[52] U.S. Cl. ........................ 297/217.3; 180/333; 180/315
[58] Field of Search .................................. 180/315, 333, 180/335; 297/217.3

[56] References Cited

U.S. PATENT DOCUMENTS

| | | | |
|---|---|---|---|
| 1,321,088 | 11/1919 | Church .................................... | 180/335 |
| 2,586,273 | 2/1952 | Steven ..................................... | 180/333 |
| 2,798,565 | 7/1957 | Rosenthal et al. .................. | 180/315 X |
| 4,180,713 | 12/1979 | Gonzales .............................. | 180/333 X |
| 4,200,166 | 4/1980 | Hansen .................................... | 180/315 |
| 4,476,954 | 10/1984 | Johnson et al. ......................... | 180/333 |
| 4,478,308 | 10/1984 | Klaassen .............................. | 180/333 X |
| 4,645,030 | 2/1987 | Von Bernuth et al. ............. | 180/315 X |
| 4,699,239 | 10/1987 | Ishino et al. ............................ | 180/315 |
| 4,701,629 | 10/1987 | Citroen ................................. | 180/333 X |
| 4,895,040 | 1/1990 | Soederberg ........................ | 180/315 X |
| 4,913,333 | 4/1990 | Janssen .................................... | 180/333 |
| 5,161,422 | 11/1992 | Suman et al. ....................... | 180/315 X |
| 5,315,900 | 5/1994 | Teeter ................................. | 180/333 X |
| 5,409,074 | 4/1995 | Wilson et al. ....................... | 180/333 X |
| 5,807,177 | 9/1998 | Takemoto et al. ............... | 297/217.3 X |

FOREIGN PATENT DOCUMENTS

| | | | |
|---|---|---|---|
| 0213886 | 3/1987 | European Pat. Off. ............... | 180/333 |
| 251643 | 1/1988 | European Pat. Off. ............ | 297/217.3 |
| 0537718 A1 | 10/1992 | European Pat. Off. .......... | B60N 2/46 |
| 2351816 | 5/1976 | France .................................... | 180/333 |
| 0135349 | 10/1981 | Japan ..................................... | 180/333 |
| 404317875 | 11/1992 | Japan ..................................... | 180/315 |
| 94026549 | 11/1994 | WIPO ..................................... | 180/333 |

Primary Examiner—Peter M. Cuomo
Assistant Examiner—David E. Allred
Attorney, Agent, or Firm—Gerald R. Ross, Esq.; Troutman Sanders LLP

[57] ABSTRACT

A control device is disclosed for vehicles, in particular towing vehicles used for agricultural purposes which have a mounting located near the front of the armrest of the driver's seat for a group of control members used to control various functions of the vehicle. A group of control members consisting of a plurality of switches or buttons and a manually-operated lever are provided to minimize fatigue when the vehicle driver is seated for a long period of time. A hand support is also included near the control members to support the palm of the vehicle driver's hand. The switches or buttons and lever are arranged so that the switches or buttons can be reached and operated comfortably with the outstretched fingers and the switching lever is located between the thumb and index finger, while the hand is resting on the hand support.

6 Claims, 1 Drawing Sheet

CONTROL DEVICE FOR VEHICLES

BACKGROUND OF THE INVENTION

1. Technical Field

The invention relates to a control device for vehicles. In particular this invention relates to a control device for towing vehicles used for agricultural purposes which have a mounting for manual control members arranged adjacent to the forward end of the armrest of the driver's seat and a plurality of manual control members mounted thereon for controlling various functions of the vehicle.

2. Description of the Prior Art

Control devices of this type, which are used for passenger vehicles and other vehicles, are known from European Patent No. 0-537-718-A1. These devices enable the driver of the vehicle to control a number of facilities or functions of the vehicle with his or her hand, while the driver's forearm rests on the armrest of the driver's seat. However, this previously described control device is not suitable for utility vehicles such as agricultural tractors. Although utility vehicles and agricultural tractors generally have relatively few manual control members which are used during working operation, these members need to be operated very frequently. For the device described in European Patent No. 0-537-718-A1, this would mean that the position of the forearm relative to the armrest would need be repeatedly adjusted to enable the driver to reach the various control members. Also the driver's hand would have to assume an unnatural position, which would soon lead to fatigue.

SUMMARY OF THE INVENTION

The present invention recognizes and addresses the above-discussed shortcomings and disadvantages, as well as others, of prior devices used to control utility and agricultural vehicles. In accordance with the teachings of the present invention, a novel control device for vehicles is provided.

The task of the invention, therefore, is to provide a control device of the type outlined above, which allows fatigue-free operation. In order to achieve this objective, a control device is disclosed including a plurality of manual control members consisting of switches or buttons, a manually operated lever, and a hand support for the palm of the vehicle driver's hand. The switches or buttons are arranged relative to the hand support in such a way that they can be comfortably reached and operated when the hand is resting on the hand support with the fingers outstretched. Additionally, the lever is positioned such that it is located between the thumb and the index finger of the hand as it rests on the hand support.

As a result of the design of the control device, the driver's forearm and his hand are supported by the hand support, as is necessary if the driver is to be seated in a relaxed position for a long period of time. When the vehicle driver is in the seated position and the manually operated lever is positioned between the thumb and index finger, the driver's hand is "centered" on the hand support so that the driver's finger tips are always in the same position relative to the switches or buttons. This makes it easier for the driver's fingers to locate the switches or buttons.

In one embodiment, the hand support may have a particularly large surface area for comfortably supporting the driver's hand. The direction in which the buttons are operated may also be optimized to correspond to the natural direction of movement of the finger tips of the hand as it rests on the hand support.

The aforementioned and other aspects of the present invention are described in the detailed description and attached illustrations which follow.

DETAILED DESCRIPTION OF THE INVENTION

Figure 1:
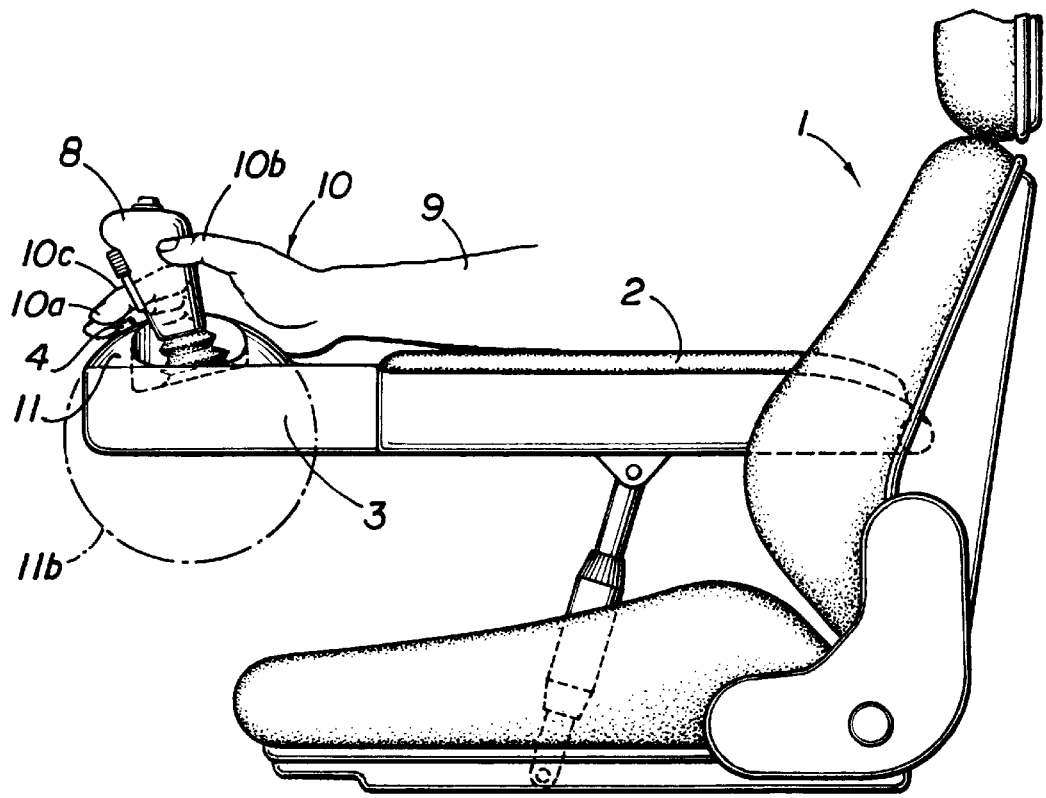
FIG. 1 is a side view of the control device mounted on driver's seat of a vehicle having an armrest.
Figure 2:
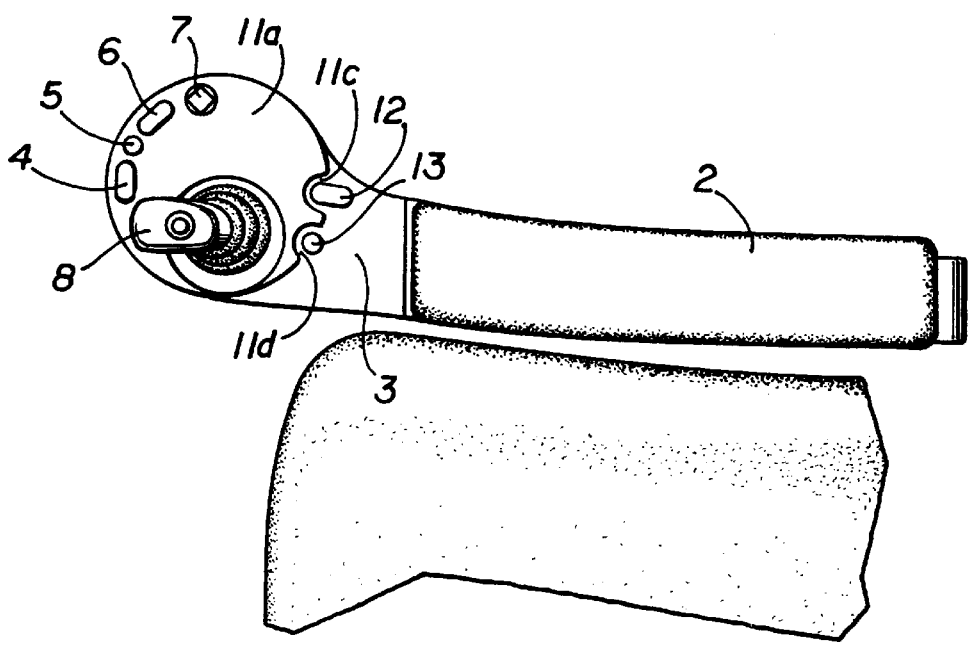
FIG. 2 is an overhead view of the control device including the armrest.

Referring now to FIG. 1 and FIG. 2 in which like reference numerals indicate like or corresponding features, FIG. 1 and FIG. 2 show the preferred embodiment of the control device for vehicles. The driver's seat 1 is provided with an armrest 2 on the right-hand side, which is formed at its front end into a mounting 3 for manual control members with manual control members 4 to 8 for specific functions of the vehicle. So that the vehicle driver's hand 10 can reach and operate the manual control members 4 to 8 comfortably when the forearm 9 is resting on the armrest 2, the mounting 3 is angled forwarded and outwards at an angle of 10° to 15° relative to the armrest 2 which runs in the generally longitudinal direction of the vehicle.

Part of the upwardly directed surface of the mounting 3 consists of a spherical surface 11 designed to match the size and curvature of the surface of the human hand. Several push-buttons 4 to 7 and a manually-operated lever 8 are arranged in a group on the spherical surface 11 to control those functions of the vehicle which have to be operated frequently and/or as rapidly as possible. For example, in the case of an agricultural tractor, the push-button 4 is used to retract rapidly a front externally mounted device, the push-button 5 is used to interrupt various functions, the push-button 6 is used to retract rapidly a rear externally mounted device and the push-button 7 is used as a quadrant switch for solenoid valves. In conjunction with a switch on the lever, the manually-operated lever 8 controls the drive of the vehicle such that pushing the lever forwards in the direction of travel causes acceleration, pulling the lever backwards away from the direction of travel causes deceleration and pushing the lever to the left or right causes a change in direction.

The push-buttons 4 to 7 and the manually operated lever 8 are arranged on the spherical surface 11 relative to one another so that a large proportion of the surface area of the driver's hand 10 is supported on part of the surface of the sphere 11, constituting a hand or palm support 11a, while the driver's forearm 9 is resting on the armrest 2. In this position, the driver can comfortably operate the push-buttons 4 to 7 as well as the manually operated lever 8. Due to the natural angle of the hand to the forearm in this position, the hand support 11a is located on the right-hand side of the spherical surface 11 in the direction of travel (suitable for operation by the operator's right hand). The push-buttons 4 to 7 are arranged on the front outer edge of the spherical surface 11 within easy reach of the finger tips 10a. The buttons are easily operable by pushing in the natural direction of movement of the fingers and are mounted so that they may be operated by pushing approximately towards the central point of the notional sphere 11b completing the spherical surface 11.

The manually-operated lever 8 is positioned relative to the push-buttons 4 to 7 so that it is naturally accessible to the thumb 10b and index finger 10c when the driver's hand 10a is resting on the hand support 11a. The left-hand portion of the hand rest 11a, also has a part-spherical surface and this assists in guiding the hand into the desired position.

Additional buttons 12, 13 which control functions having the potential to cause damage if unintentionally operated are provided at the rear peripheral region of the spherical surface 11. To ensure that these buttons can not be unintentionally operated by an involuntary movement of the hand 10 on the hand-rest 11a, they are each set in a recess 11c, 11d in the peripheral area of the part spherical portion of the mounting 3. In this way, they are protected from accidental operation by the palm of the driver's hand.

What have been described above is the preferred embodiment of the present invention. It is, of course, not possible to describe every conceivable combination of methodologies for purposes of describing the present invention. However, one of ordinary skill in the art will recognize that any further combinations, permutations and modifications of the present invention are possible. Therefore, all such possible combinations, permutations and modifications are to be included within the scope of the claimed invention, as defined by the claims below.

I claim:

1. A control device for controlling functions related to the operation of a motor vehicle having an operator's seat and an armrest positioned horizontally adjacent to said operator's seat for supporting an arm of an operator in an elevated horizontal position adjacent said operator's seat, said armrest having a top surface defining a horizontal plane, said control device comprising:

a mounting carried by said armrest for allowing the operator to control said functions related to the operation of said motor vehicle;

said mounting comprising a palm support having an upwardly convex surface extending above said horizontal plane generally following the shape of a sphere, said palm support encompassing a minor portion of a sphere;

said upwardly convex surface having a periphery abutting said mounting;

a plurality of manual control members carried by said mounting for controlling said functions related to the operation of said motor vehicle.

2. The control device of claim 1, said manual control members further including a lever.

3. The control device of claim 1, wherein said manual control members include a recessed button for controlling a function related to the operation of said vehicle.

4. The control device of claim 1 wherein said plurality of manual control members are carried by the periphery of said palm support.

5. The control device of claim 1 wherein said plurality of manual control members are carried adjacent the periphery of said palm support so that they may be manipulated by the operator when the fingers of an operator's hand are extended along said palm support.

6. The control device of claim 1 wherein said plurality of manual control members are carried by said palm support.

* * * * *